United States Patent [19]

Cummings

[11] Patent Number: 5,101,537
[45] Date of Patent: Apr. 7, 1992

[54] RATCHET TIE-DOWN

[75] Inventor: David S. Cummings, Princeton, Mass.

[73] Assignee: Lowell Corporation, Worcester, Mass.

[21] Appl. No.: 561,005

[22] Filed: Aug. 1, 1990

Related U.S. Application Data

[63] Continuation-in-part of Ser. No. 260,001, Oct. 19, 1988, abandoned.

[51] Int. Cl.$^5$ .............................................. A44B 21/00
[52] U.S. Cl. .................................... 24/68 CD; 24/71.2
[58] Field of Search ............ 24/68 R, 68 CD, 68 SK, 24/68 B, 71.2, 68 CT; 410/100

[56] References Cited

U.S. PATENT DOCUMENTS

| | | | |
|---|---|---|---|
| 3,988,007 | 10/1976 | Freiburger, Jr. | 24/68 R |
| 4,045,002 | 8/1977 | Miller | 24/68 CD X |
| 4,234,166 | 11/1980 | Cederblad | 24/68 CD |
| 4,799,297 | 1/1989 | Baggio et al. | 24/68 SK |

Primary Examiner—James R. Brittain
Attorney, Agent, or Firm—Shlesinger, Arkwright & Garvey

[57] ABSTRACT

A ratchet tie down structure is shown that is designed to hold heavy objects in place on a transport vehicle such as a flat bed trailer, a car carrier, a railroad car and the like. The mechanism includes a base element attached to the transport vehicle that has pair of cooperating elements having interfitting ratchet teeth and a latch that permit a shaft to be turned in one direction to tighten a flexible holding element attached to the object with the latch holding the tension therein until the ratchet teeth on the two elements are disengaged. The structure includes a driving connection by which the shaft may be rotated in one direction to wind a tension in the flexible holding element and the latch being selectively operative to disengage one of the elements with the ratchet teeth from the other in order to release the tension in the flexible holding means when the heavy object is to be unloaded.

7 Claims, 3 Drawing Sheets

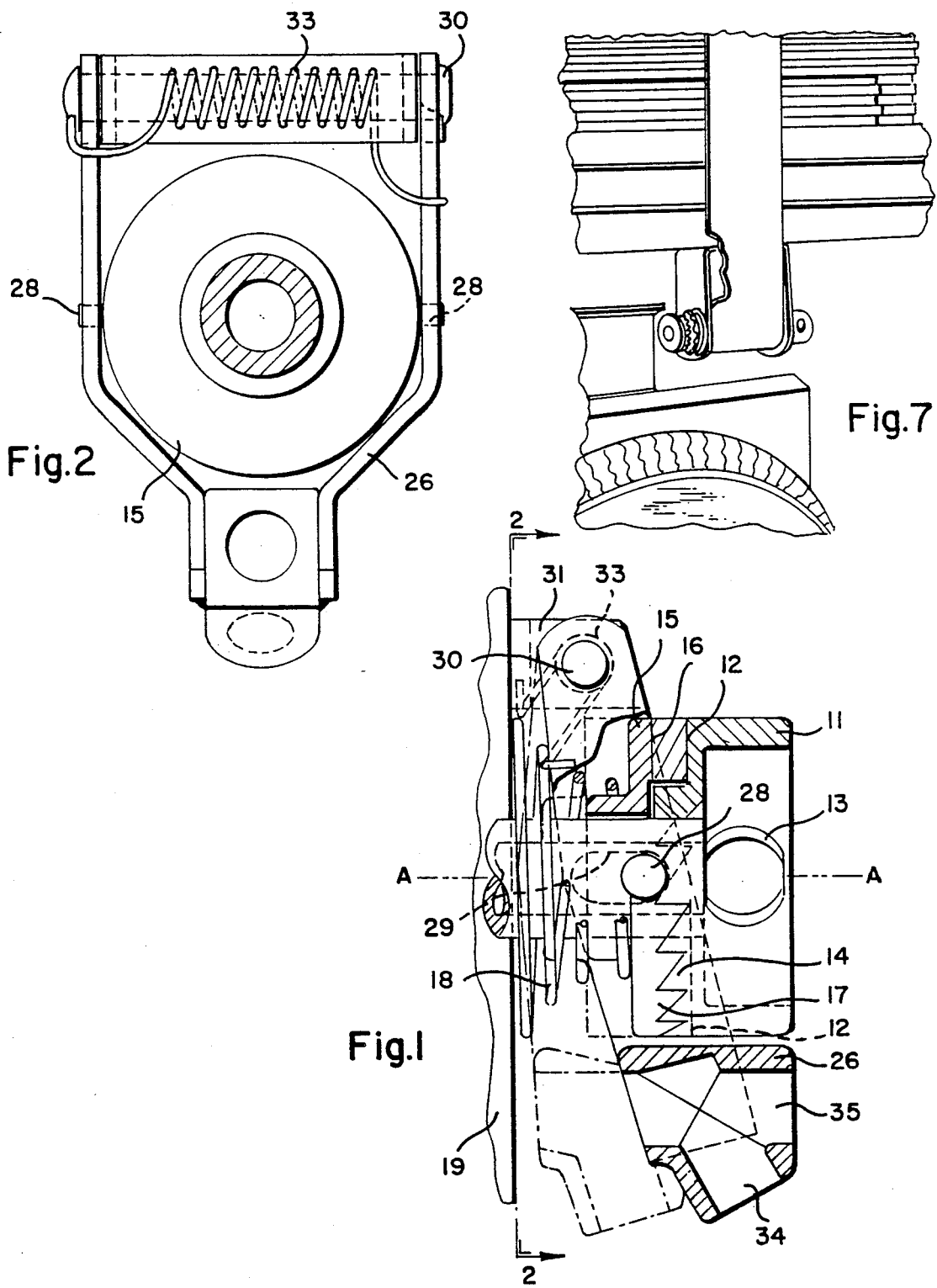

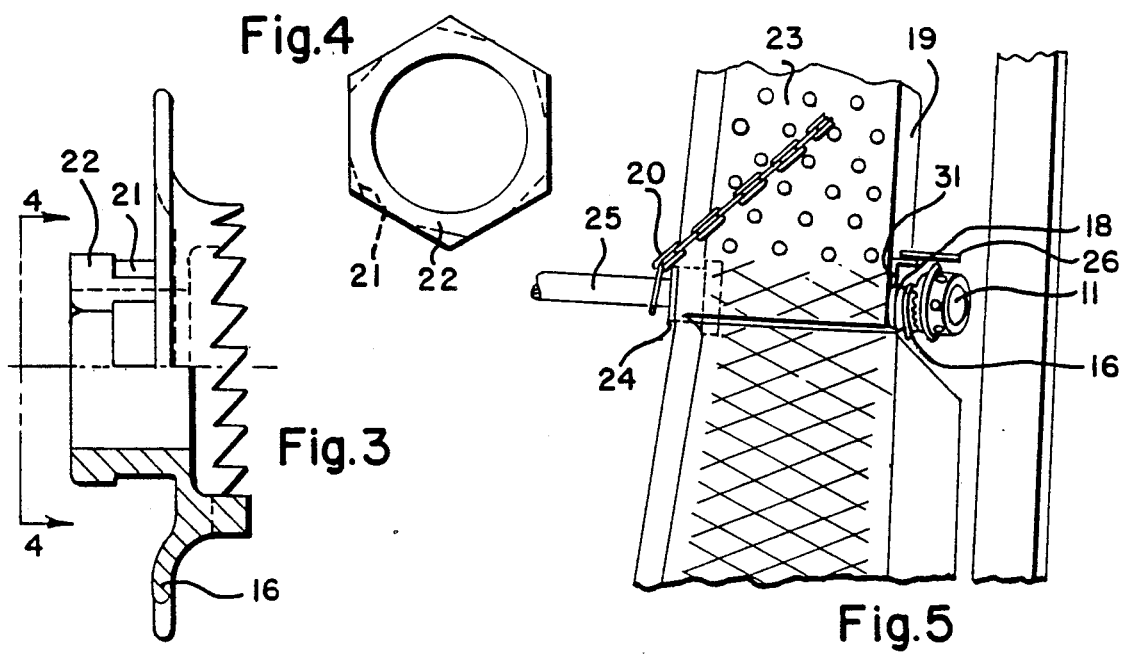
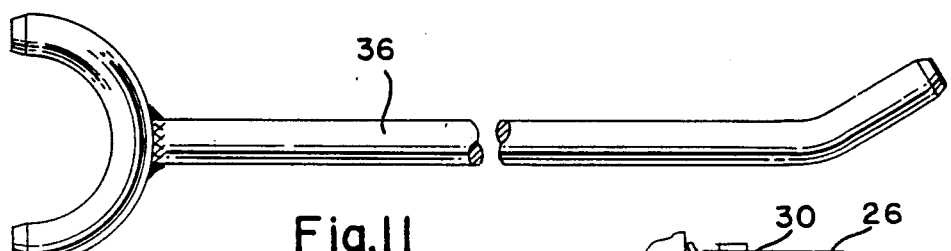
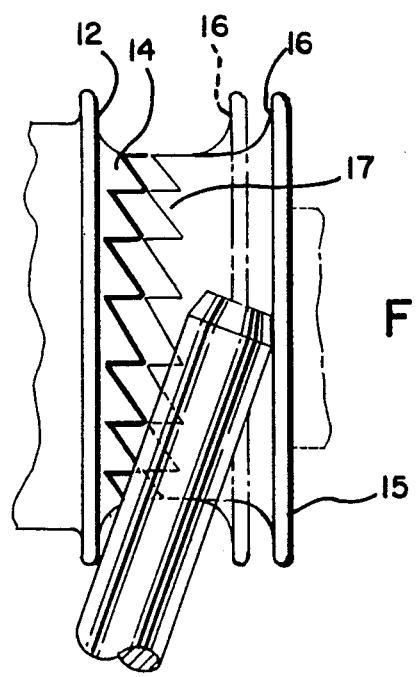
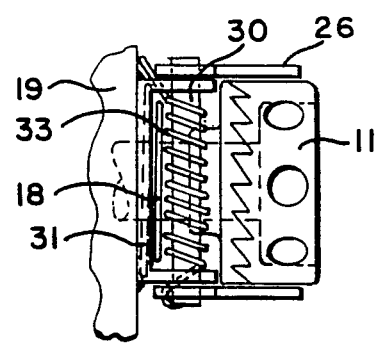

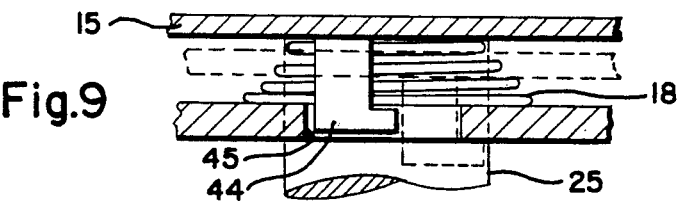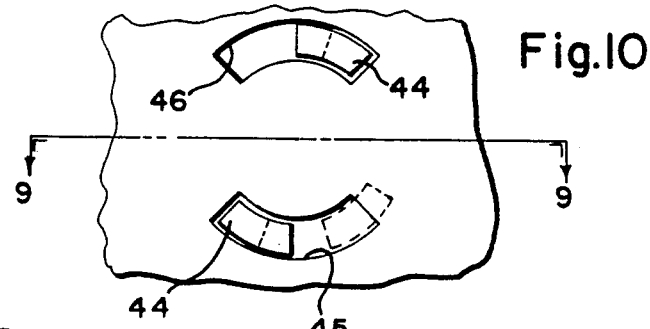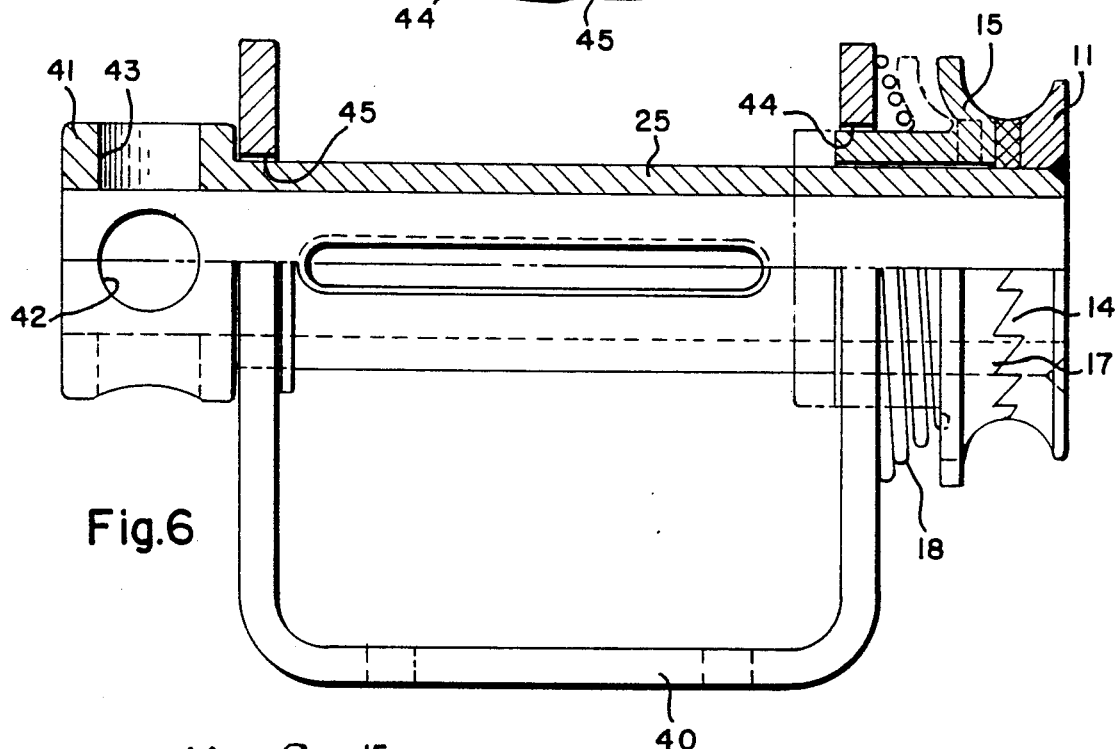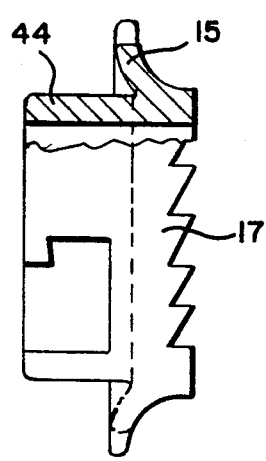

RATCHET TIE-DOWN

This is a continuation-in-part of my application Ser. No. 07/260,001, filed Oct. 19, 1988, abandoned, for Ratchet.

This invention relates to a means for anchoring objects to be transported onto the flat beds or decks of transport vehicles such as auto transport trailers, flat bed trucks and trailers, railroad flat cars by tensioning a flexible strap or chain or the like around the object to fasten it to the transport means.

BACKGROUND

In the transport or freight hauling industry there is a need for means to quickly and easily apply a suitable tension to chains, straps, cables and ropes that are adapted to fix heavy objects in place on the transport means. The device for pulling the tension in the flexible means must also be constructed and arranged to hold the tension in the flexible tie-down while the objects are being transported and yet that device must be adapted to be quickly and safely operative to release the tension in the flexible tie-down means for unloading the objects when the destination has been reached.

Heretofore, one form of a tie-down system has been used which makes used of a manually manipulated rotating take up shaft for wrapping a flexible tie-down means around its periphery, the shaft having a toothed wheel integral therewith that coacts with a pawl to hold the tension in the flexible tie-down. A suitable winding or cranking means is provided to wind the flexible tie-down on the shaft and the pawl must be released at the destination to permit the unloading of the heavy object from the transport. In practice at the freight depot, the tension in the tie-down is released by using a pry bar or a crank on the toothed wheel to slightly tighten the flexible tie-down in order to release the load on the pawl and then the operator can move the pawl to its unlocked position whereupon the toothed wheel can be turned to reverse the rotation of the shaft to fully release the pull on the tie-down. The use of the fingers near the pawl adjacent the toothed wheel to unlock the pawl as has been the practice in the past, has resulted in some painful accidents to the operators including even the loss of fingers when the crank or pry bar has been accidentally released during the tension releasing process.

PRIOR ART

In my prior application, the following art was made of record:

| | | |
|---|---|---|
| 65,386 to | Hubbard | June 4, 1867 |
| 78,245 to | Weiland | May 26, 1868 |
| 351,735 to | Brill | November 2, 1886 |
| 416,996 to | Cook | December 10, 1889 |
| 500,529 to | Burns | June 27, 1893 |
| 2,899,841 to | Melloy | August 18, 1959 |
| 3,988,007 to | Freiberger Jr. | October 26, 1976 |
| 4,635,773 to | Llewllin | January 13, 1987 |

While all of the above cited patents illustrate various one-way drive systems making use of a ratchet drive means, only Cook and Freiburger show means to tension a flexible or other means and lock the flexible element in its tensioned condition.

Hubbard and Weiland show one way ratchet drive means for use on agricultural equipment. Brill and Burns show manually driven crank means operating through a ratchet drive for applying the brakes on railroad cars and Melloy shows a one way ratchet drive for a control knob on a household appliance. Not one of these prior art patents describes a locking means associated with the ratcheting device.

The patent to Cook discloses a means that forms a clutch in a device for applying the brakes on a railroad car or the like wherein a pawl or foot dog 18 is shown that coacts with a toothed ratchet 8 to enable a brakeman to pull a tension in a chain to apply the brakes on a railroad car. When the brakes have been set, the pawl or foot dog 18 engages the ratchet to hold the brakes set hard. In order to unlock the brakes, the brake-handle may be moved to a position to turn the ratchet forwardly "with his entire strength" (page 2, column 1, line 28) to give the ratchet some additional forward movement to enable the brakeman to move the foot-dog to release the ratchet.

The Freiburger Jr. patent discloses a device adapted for a sedentary use such as for holding down a mobile home. This construction makes use of a bolt rotatably mounted in a holder adapted to be anchored to the ground. The bolt is driven to wind up a strap to place a constant pull on the structure to which the strap is attached by connecting the strap supporting means to an anchoring device that is resiliently supported from a rod driven into the ground.

The Freiburger Jr. structure includes a series of co-acting ratcheting teeth associated with a fixed means that supports the bolt. The teeth are resiliently urged into engagement by means of a spring that cooperates with the bolt as the bolt is rotated by a hand held wrench to wind up the strap to place it under tension. Once the holding means is placed under tension. This device is intended to be mounted permanently in one place and no means are shown for unloading the resilient tension pulled on the strap.

SUMMARY OF THE INVENTION

This device finds use particularly in the heavy duty transport field and includes a ratchet having an input element and an output or hold-back element arranged for relative rotation about a common axis of a take up shaft and in this disclosure the output element has a limited relative resilient longitudinal movement along the shaft relative to the input element. Each element has a circular array of teeth that engages a similar array of teeth on the other element. Each tooth has an axially-extending forward face and an inclined rearward face. The teeth in the input element face in one direction opposite to the direction of the teeth on the output element, so that rotation of the input element in one direction causes the rearward faces to act in a camming mode with relative axial movement of the output element to the input element, while rotation of the input element in the other direction causes the forward faces to engage in a locking mode.

In its preferred form, the tie-down is mounted along a side of a trans-port means. For this use the input element is integral with the shaft for winding a flexible hold-down means around its periphery and the relatively longitudinally movable output element is non-rotatably mounted relative to the input means. When the input element is driven to wind up the flexible strap or other holding means for engaging the object to be held on the transport, the teeth on the input and output elements coact to first allow the shaft to be rotated to pull the tension in the flexible means and then lock the input means in its wound up position to retain the tension pulled in the flexible holding means in order to hold that object bound to the transport means. After the transport has arrived at its destination, the output element may be moved longitudinally away from the input element to release the tension in the flexible holding means to permit the object to be unloaded from the transport vehicle.

IN THE DRAWINGS

FIG. 1 is a side elevation partly in section showing one form of the ratchet tie-down device of this invention;

FIG. 2 is an elevational view of the device looking at the tie-down along the plane 2—2 of FIG. 1;

FIG. 3 is a detailed side elevation partly broken away showing one form of an output element for the tie-down of this invention;

FIG. 4 is an end view of the output element of FIG. 3 looking along line 4—4 of FIG. 3;

FIG. 5 is a perspective view partly broken away showing the device of FIG. 1 mounted on a car carrier transport means;

FIG. 6 is a side elevation of an alternate form of the tie-down device, shown partly in section;

FIG. 7 is a perspective view showing the device of FIG. 6 mounted in a typical manner on the side of a flat-bed transport means;

FIG, 8 is a side elevation of the output element of the device shown in FIG. 6 partly broken away;

FIG. 9 is a top view partly broken away showing the output element of FIG. 6 assembled together with the support frame for the device;

FIG. 10 is an end view of the output element shown in FIG. 9 looking at the inside end of that element;

FIG. 11 is side view of a tool that can be used for operating the tie-down of this invention; and FIG. 12 is a view showing the forked end of the tool in position for moving the output element of this invention way from the input element to release the tension in the flexible tie-down holding means of this invention; and FIG. 13 is a detailed top view of the mechanism shown in FIG. 5.

DETAILED DESCRIPTION

Referring first to FIGS. 1, and 2 wherein are shown the general features of one form of this invention, the ratchet tie-down includes a generally cup shaped input element 11 integral with a shaft for wrapping up a flexible holding means and a holdback or output element 15 that is non-rotatable for holding the tension in the holding means after the tension has been pulled in the holding means. The output element may provide a bearing for the outer end of the wrapping shaft and the output element is longitudinally slidable relative to the shaft. For the purpose of turning the shaft, the wall of the cup portion of the input element is provided with apertures 13 for receiving the end of a driving bar as will appear fully below and the input element 11 has a bottom disk-like configuration having a face 12 with a circular band or array of ratchet teeth 14 extending axially therefrom. Similarly, the output element 15 has the general shape of a disk that has a face 16 from which protrudes a circular array of ratchet teeth 17 that are shaped to and are disposed to cooperate with the teeth 14 on the disk 11.

As shown in FIGS. 1 and 5, a resilient means such as the coil spring 18, presses against the side wall 19 of the auto track element of an automobile car carrier transport trailer upon which this device is mounted, for example to bias the output element toward the input element so that the cooperating ratchet teeth 14 and 17 are pressed into engagement. Each tooth 14 of the input element has a forward face and a rear face, the forward face lying in a plane that passes through an axis A—A and the rear face that is sloped relative to the forward face. In the same way, the teeth 17 of the output element are formed with a forward face and a rear face that face in the opposite direction from the teeth on the input element. In other words, the forward faces of the input element are directed toward the forward faces of the output element to lock together in one direction of rotation as will appear more fully below and rotation in the opposite direction causes the rear faces to act in a slipping or camming mode to unlock the engaged teeth. This structure provides a ratchet drive having a positive drive connection when the input and output elements are driven in one direction and a ratcheting connection when these elements are driven in a reverse direction.

As shown in FIG. 5, this tie-down means is adapted to be mounted on a car carrier transport means. In this use, the input element 11 is fixedly mounted on the outboard end of the wrapping shaft that is rotated to pull the tension on the holding means and shaft 25 is rotatably carried in the output element. The body of this output element is slidably mounted in a suitable aperture in the outside wall 19 of the inverted channel member 23 that provides the track for supporting the cars on the carrier vehicle, with the shaft 25 extending under the track 23. The free end of the shaft extends inwardly toward the center of the carrier and is made to be fixedly attached to the end of the flexible holding means so that upon rotation of the shaft the flexible tie-down will be wrapped about the axis A—A shown in FIG. 1. The output element supported in the wall 19 is a bearing support for one end of the shaft 25 and an inboard bearing 24 is provided for the inner end of the shaft to support the shaft for rotation as well as to provide a thrust bearing to hold the shaft in place under the channel 23.

The flexible hold down means may take the form of a chain or a cable or other suitable strapping means, the end of which is fixed to the shaft 25 that is adapted to be connected at its opposite end with one corner of the frame or some other rigid element of a car on the carrier, to hold that corner of the car in a fixed position on the carrier. There will be one tie-down means for each corner of a car on the carrier. The output element 16 is mounted concentrically about axis A—A for sliding motion on the shaft 25 and is normally urged toward the input element 11 by spring 18. The output element is restrained from rotation about the axis by a latch 26, the output element having opposed pegs which engage in apertures 29 in the side arms of the latch 26.

The latch 26 is generally U shaped with the legs hinged at their top ends for swinging action on a base 31 fixed to the wall 19 of the car carrier track. A pivot pin 30 that passes through the legs of the latch is carried by the base and provides a generally horizontally disposed bearing means for a coil spring 33 that surrounds the pin and has one leg that engages the wall 19 and another leg at its other end that engages one leg of the latch to bias the latch toward the input element. With this arrangement the pegs 28 add the further pressure of spring 33 pressure through the latch to the pressure of spring 18 to urge the ratchet teeth on the output element into firm contact with the ratchet teeth on the input element. The bottom of the latch has an integral socket means having apertures 34 and 35 to receive the end of a release bar as will be explained below.

When a car carrier has been equipped with a plurality of these tie-down means each one of which is adapted to cooperate with a respective corner of a car on the carrier and a full complement of cars have been driven onto the carrier, the respective flexible hold-downs 20 each keyed to their respective shafts 25 can then each one be connected to a fixed element at the respective corners of each of the cars on the carrier. The plain end of a bar 36 like that shown in FIG. 11 can then be inserted in the apertures 13 in the walls of the cup shaped input elements to rotate each one of the respective shafts 25 in a direction to wrap each flexible hold-down 20 around its shaft. As the input element is rotated the ratchet teeth of the non-rotatable output element ratchet over the teeth of the driven input element and the spring 18 constantly urges the output teeth into engagement with the input teeth. Each tie-down means is operative to first draw and then hold the tension drawn in the flexible means since the output element is constantly restrained from rotation by the pegs 28 integral with the output means and which are engaged in bearings in the legs of the latch 26. A tie-down at each corner of each car is operated in this manner to positively restraint each car on the carrier during transport over the highways.

When the carrier reaches its destination, each tensioned flexible holding means is released to free the cars for removal from the carrier. This release of the tension is easily accomplished by simply fitting the plain end of the bar 36 in one of the sockets 34 or 35 of the latch means and pushing the latch inwardly against the bias of the spring 33. When the latch swings in, the pegs 28 force the output element 15 to slide inwardly along shaft 25 and the ratchet teeth 17 of the output element are thus moved to be disengaged from the ratchet teeth 14 of the input element.

Because the locking torque forces are transmitted by engagement between the forward faces of all the teeth 14 of the input element to the forward faces of the teeth 17 of the output element, the total force absorbed in the ratchet means can be very large, while the force carried by any one pair of mating teeth is quite small. Furthermore, because each tooth is connected to the flat face of its respective input or output element, it has a broad base to resist the shear forces that develop during torque transmittal. Also it is possible to use relatively fine teeth to obtain small torquing increments without sacrificing strength. In addition, the extent of the teeth in the radial direction can be made as wide as may ever be necessary to carry all the load that could possibly be required for the purposes described herein.

In some instances when a car is being attached to or disconnected from the tie-down, it may be desirable to hold the output element disengaged from the input element. As shown in FIGS. 3 and 4, the inner end of the output element has a hexagonal shape 22 and ramps 21 are cut into the hex. With this construction, when the output element is at its innermost position as shown in dotted form in FIG. 1, the output element can be manually rotated to lock this element in its innermost position when the corners of the hex will be turned to be engaged behind the wall 19 to hold the output element locked in the disengaged position so that the shaft 25 can free wheel to permit the flexible holding means to be more easily arranged as desired. When the device is to be used on a car or the tie-down is to be stored while the car carrier is running empty, the corners of the hex portion of the output element should be released from their engagement behind the wall 19 so that the flexible hold-down can be held in a properly wrapped up position.

This device can be used on other flat bed transport means such as is shown in FIGS. 6-10. In this form the invention can be adapted for mounting along the side of a flat bed transport means to pull a strap or other flexible holding means tightly bound around an object on the bed. As shown in FIG. 7 a load of plywood sheets are shown strapped onto the bed of a trailer.

One form of such a portable tie-down means is shown in FIG. 6 where a roughly U shaped bracket is provided that may be bolted to the underside of the edge of the flat bed as shown in FIG. 7. It is suggested that a number of different mounting arrangements can be provided for fixedly securing the bracket to the edge of a transport means in any position where needed to properly draw a flexible holding means around the object. Since many different shapes and sizes of articles are transported over the roads on flat bed vehicles of different kinds it is essential that the tie-down unit be made in a form to be easily attached to such a vehicle wherever it may be needed to pull the flexible holding means taut.

The tie-down assembly of FIG. 6 is essentially the same as that shown in FIG. 1, the input element 11 being mounted integral with the shaft at one end to cooperate with the output element 15 that is resiliently urged into contact with the input element by the coil spring 18. The opposite end of the shaft has an integral hub 41 that is provided with apertures 42 and 43 to receive the end of the rod 36 of FIG. 11 to turn the shaft for drawing a tension in the holding strap when a load is being strapped to the flat bed. When the shaft is turned a strap or other flexible holding means is wrapped on the shaft and the ratchet teeth 14 and 17 on the input and output elements interact as above described to hold the tension until the ratchet teeth are disengaged to free the shaft for reverse rotation when the output element is moved inwardly along shaft 25 by means of the forked end of the rod 36.

In the form of the device shown in FIG. 6, the arcuate hub elements 44 of the output elements are designed to be mounted in the arcuate bearing openings 45 and 46 in the free end of one of the legs of the U shaped frame 40. The output element is essentially held against rotation but is permitted to have a limited degree of oscillatory motion in the bearing openings 45 and 46. The hub elements are L shaped and the stem of the L has a length such that when the output element is pushed toward the leg of the U bracket against the bias of the coil spring 18 the foot of the L can be engaged behind the leg of the bracket to hold the ratchet teeth of the output disengaged from the ratchet teeth of the input element. This permits the device to be held in a free wheeling condition to facilitate the attachment of the holding strap to or the removal of the holding strap from the shaft 25 as the device is made to cooperate with the object on the flat bed.

As with the type of tie-down having the latch mechanism built in, this last described tie-down is made to have its tension released by using the tool shown in FIG. 11 to disengage the ratchet teeth when the device is under a tension load. It is merely necessary to use the forked end of the rod 36 between the input and output elements of this device mounted in the U shaped bracket to urge the output element toward the leg of the bracket 40 to disengage the ratchet teeth in this form of the tie-down. As the output element 15 is held in its disengaged position, it may be manually turned to engage the foot end of the L shaped hub elements 44 behind the leg of the bracket as shown in dotted lines of FIG. 9 to set the device for a free wheeling condition.

The above is a description of the preferred form of this tie-down device and its use. It is possible that modifications thereof will occur to those skilled in the art that will fall within the scope of the following claims.

I claim:

1. A compact hold down device designed to hold heavy objects in place within the confines of a transport means, which objects are being transported on such transport means in commerce such as on car carriers, flat bed trailers, rail road cars and the like; said device including a ratchet means, said ratchet means including a first series of ratchet teeth and a second set of complementary ratchet teeth, said device being operative to apply a tension to and to hold the tension in a flexible holding means such as a chain or a strap adapted to coact with an object for holding said object in place on said transport means during such movement and then said hold down device being operative to release the tension applied to the holding means to permit the unloading of said objects from said transport means; said hold down device that is mounted on said transport means comprising a base element for said hold down device that is fixed to said transport means: a shaft to which said flexible holding means is attached and said shaft being rotatably mounted in said element supported on said transport means for rotation in either a clockwise or counter clockwise direction about an axis; said shaft having an end accessible from beyond the confines of said transport means; an input means integral with said accessible end of said shaft and said input means being adapted to be rotatably driven to drive said shaft in one of said directions for wrapping said flexible means on said shaft for tensioning said holding means; an output element slideably mounted on and being relatively rotatable with respect to said shaft; latch means pivotally supported on said base element fixed to said transport means for engaging with and being operative to slide said output element toward and away from said input element; means interacting between said latch means and said output means to preclude the rotation of said output element with said shaft when said shaft rotates in either said clockwise or counter clockwise direction; means to resiliently bias said latch means together with said output element toward said input element; said first series of ratchet teeth being integral with said input element which teeth are disposed in a circular pattern concentric about said axis and which face toward said output element; said second set of complementary ratchet teeth being integral with said output element and being disposed in the same concentric circular pattern about said axis and which face toward said input element; said first series and said second set of ratchet teeth being designed to interact one with the other; said latch means including a release adaptor means which can be engaged to swing said latch against said bias of said resilient means to move said output element away from said input element to disengage said second series of ratchet teeth from said first series of ratchet teeth; said latch means being a U shaped member with the open ends of the U being mounted on bearing means carried by said base element; and the closed end of the U shaped latch member having said release adaptor integral therewith; said hold down device being constructed and arranged to permit said flexible holding means to be placed under tension by being wound up on said shaft when said shaft is rotated in said one direction while said first series and said second set of ratchet teeth are resiliently urged into complementary engagement whereby said holding means is held in its tensioned state by said interengaged first series and second set of ratchet teeth as said shaft is rotated in said one direction and said latch means being operative through said interactive means to slide said output element on said shaft and away from said input element to disengage said second set of teeth from said first series of ratchet teeth to permit said shaft to rotate freely in a direction the opposite to said one direction in order to release the tension in said flexible holding means to permit said heavy objects to be unloaded from said transport means.

2. A ratchet device for tensioning a flexible holding means engaged with a load of one or more objects to hold said load in place on the bed of a transport means while said load is in transit comprising a rotatable input element having ratchet teeth integral therewith, a shaft adapted to be rotated by the rotation of said input element to draw a tension in said flexible holding means, a hold-back element that is non-rotatable relative to said input element, said hold back element having ratchet teeth integral therewith for cooperating with the ratchet teeth on said input element, said hold-back element being movable toward and away from said input element to permit said ratchet teeth to be engaged when said input and hold-back elements are pushed toward each other whereby to hold any tension pulled in the flexible holding means while said teeth are engaged, and said hold-back means being movable away from said input element to disengage the teeth of the hold-back element from the teeth of said input element, resilient means to bias said hold-back means toward said input means so that said ratchet teeth coact with each other when said input element is rotated, and pivotally operative U shaped means to move said hold-back element against the bias of said resilient means to disengage the ratchet teeth of said hold-back means from said ratchet teeth of the input means in order to release any tension in said flexible hold down means.

3. A ratchet device as in claim 2 wherein there are means to hold said hold-back element in a disengaged position.

4. A ratchet device as in claim 3 wherein said hold-back element is slidably mounted on said shaft and can be oscillated several degrees in opposite directions about the shaft, locking means associated with said hold back means and said oscillating motion serving to engage said locking means to maintain said hold-back means with its ratchet teeth disengaged.

5. A ratchet means as in claim 3 wherein said ratchet device is mounted on a fixed support means, and said hold-back element includes a cylindrical body that surrounds said shaft, said hold-back element supporting said integral ratchet teeth on one end of its body and having locking means formed on its opposite end, said locking means being adapted to be positively engaged with said fixed support to fixedly position said hold back means with its ratchet teeth in an disengaged position.

6. A ratchet device as in claim 5 wherein said locking means takes the form of an L shaped aperture at said opposite end of said body defined by walls integral with said body, and said fixed support having elongated slot means therein for cooperating with said integral walls that form said locking means whereby the said L shaped locking means may be pushed through said slot and then said body can be oscillated therein to engage said L shaped means on said fixed support.

7. A ratchet device as in claim 5 wherein said locking means takes the form of a pair of non-congruent hexagonal flanges disposed one next to the other at said opposite end of said body, said fixed support having a hexagonal aperture formed therein for cooperating with said non-congruent flanges such that first one of said pair of flanges may be passed through said aperture and after that flange has passed completely through the aperture the other hexagonal flange of said pair can be fitted through the aperture so that the first hexagonal flange is turned to a non-congruent position with respect to said aperture.

* * * * *